T. HOOCK.
ELECTRICALLY HEATED APPARATUS.
APPLICATION FILED OCT. 23, 1912.

1,101,550.  Patented June 30, 1914.

UNITED STATES PATENT OFFICE.

THEODORE HOOCK, OF COELN, BAYENTHAL, GERMANY, ASSIGNOR TO WESTINGHOUSE ELECTRIC AND MANUFACTURING COMPANY, A CORPORATION OF PENNSYLVANIA.

ELECTRICALLY-HEATED APPARATUS.

1,101,550.  Specification of Letters Patent.  Patented June 30, 1914.

Application filed October 23, 1912. Serial No. 727,296.

*To all whom it may concern:*

Be it known that I, THEODORE HOOCK, a subject of the Emperor of Germany, and a resident of Coeln, Bayenthal, Germany, have invented a new and useful Improvement in Electrically - Heated Apparatus, of which the following is a specification.

My invention relates to electrically heated apparatus and it has special reference to cooking ovens and other similar devices of the so-called "heat storage" type that are provided with masses of material for accumulating or storing heat that may be electrically supplied thereto at a low and substantially constant rate, whereby the heat thus accumulated may be available for various cooking operations at any desired rate.

The object of my invention is to provide a device of the above-indicated character that shall be simple, compact and durable in construction and efficient in operation, and have readily adjustable means whereby the distribution of heat within the oven may be regulated to suit the particular cooking operation that is being performed.

My invention may best be understood by reference to the accompanying drawings in which—

Figure 1:
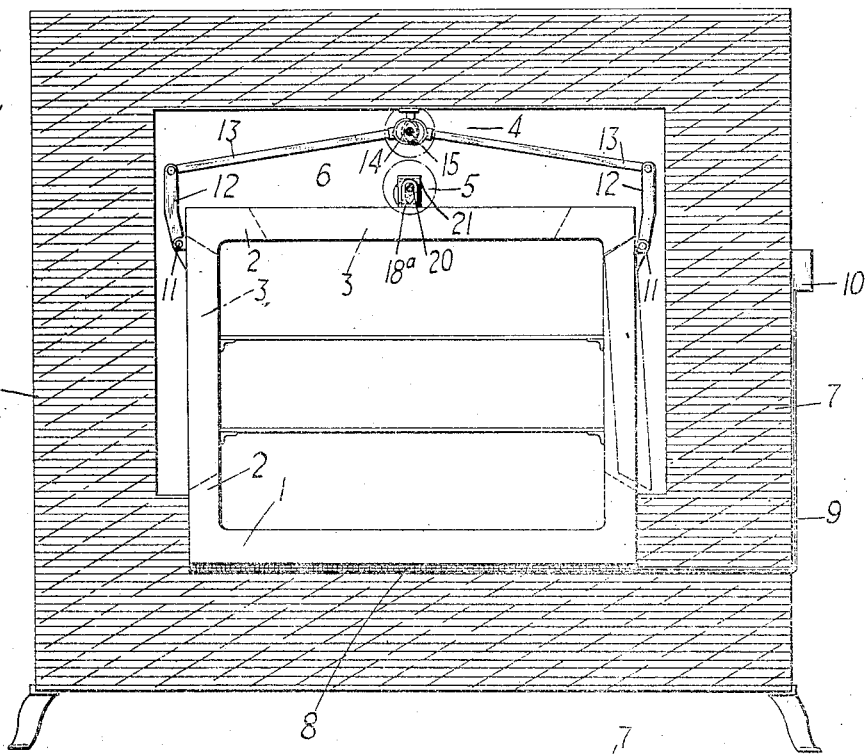
Figure 2:
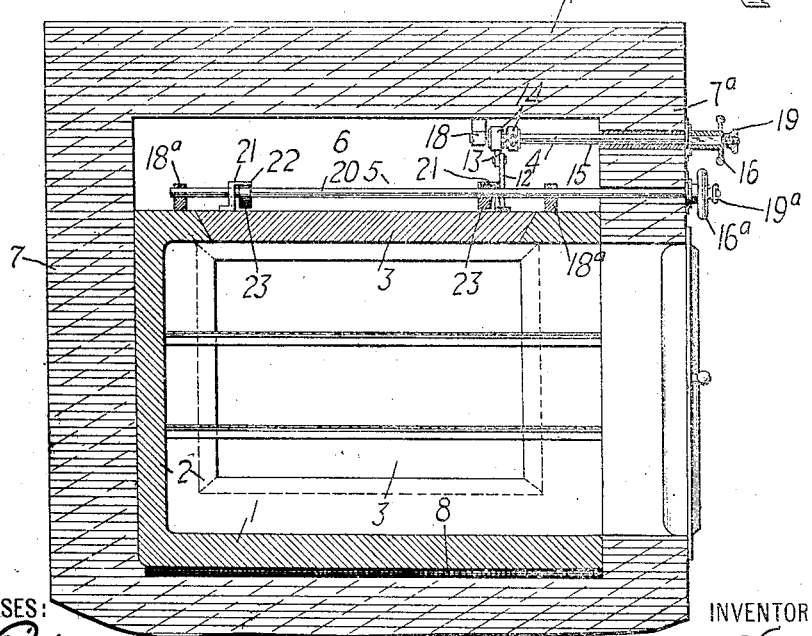

Figure 1 is a view, partially in section and partially in front elevation, of a device constructed in accordance with my invention, and Fig. 2 is a view, partially in section and partially in side elevation, of the device shown in Fig. 1.

Referring to the drawing, the apparatus shown comprises a receptacle or shell 1 of heat-storage material having a plurality of walls 2, some of which are provided with openings to receive movable members 3 of a similar material, independent actuation of which to any desired position may be effected through the agency of adjustable mechanical means 4 and 5. The mechanical means, just referred to, are conveniently disposed in a compartment 6 that is provided between the shell 1 of heat-storage material and a plurality of walls 7 of heat-insulating material which envelop the inner shell of the oven and prevent loss of heat by radiation. The shell 1 of the device may be constructed of cast iron, although I do not wish to be restricted in this respect, as any material may be employed which is adapted to accumulate and store heat. The movable members 3 are preferably made of material like that which constitutes the main portions of the receptacle 1, although other suitable material may be employed, if desired.

Disposed immediately below the bottom wall of the oven is an electric heater 8 which forms no material part of my present invention, except as it performs a necessary function in the operation of the apparatus and, hence, any well known construction may be employed. The heater 8 is provided with leads 9 which terminate in a connection box 10 that is suitably located on the exterior of the oven for the purpose of connection to a suitable source of electrical energy (not shown).

The movable members 3 are provided with inwardly inclined edges which are adapted to coöperate and make intimate contact with similarly inclined edges of the walls 2 with which said members 3 are associated. The movable members 3 which constitute portions of the side walls 2 of the oven shell 1 are of like construction and each is pivotally mounted at its upper end upon a rod 11 or other suitable device. Furthermore, each of the movable members referred to is provided with an integrally associated arm 12 which projects upwardly and is pivotally connected to one end of a connecting rod 13, the other end of which is associated with an eccentric 14 in a well known manner. The several eccentrics 14 are fixed to an operating shaft 15 which projects through the front insulating wall 7ª and the outer end thereof is provided with a hand wheel 16 which is rigidly secured thereto.

The inner end of the shaft 15 is journaled in a bearing member 18, and the eccentrics 14 are disposed upon said shaft so as to effect concurrent operation of the side movable members 3 when the shaft 15 is rotated through the agency of the hand wheel 16, it being understood that said movable members 3 are given an outward rotative movement when the hand wheel 16 is turned in one direction, and a movement in the opposite direction when the hand wheel is turned in the other direction. In order to lock the movable members 3 in any desired position, the outer end of the shaft 15 is provided with a locking nut 19 which coöperates with the hand wheel 16 in the usual manner.

The mechanical means 5 comprises a shaft 20, the outer end of which is provided with a hand wheel 16ª, and a locking nut 19ª similar to those hereinbefore described, and said shaft is journaled in suitable bearing members 18ª which are secured to the shell or receptacle 1. The movable member 3, which forms a part of the upper wall of the oven is provided with a plurality of supporting brackets 21 which are secured thereto, and said members are provided with end portions 22 which are disposed in substantially a horizontal plane. Rigidly disposed upon the shaft 20 and in coöperative engagement with the horizontal portions 22 of the bracket portions 21 are cam members 23. The contour of said cams 23 is such that rotative movement of the shaft 20 causes the upper movable member 3 to be raised out of contact with the main portion of the upper wall of the heat storage shell 1.

Assuming the several parts to occupy the positions shown in the drawing, it is evident that the upper portion of the oven is maintained at its highest temperatures by reason of the fact that the edges of the several movable members 3 are in engagement with the adjacent edges of the heat storage shell 1 and, hence, the greatest amount of heat storage and heat conducting material is utilized, whereby the flow of heat from the electric heater 8 to the upper wall of the oven is maximum.

In certain cooking operations, it is desirable to have a comparatively low heat at the top of the oven and, in such cases, the adjustable mechanical means 5 may be employed for raising the top movable member 3 out of contact with the adjacent edges of the upper wall, thereby interposing air gaps between this member and the upper walls and thus reducing the flow of heat and consequently the temperature of the upper portion of the oven. If it is desired to reduce the heat supplied to the sides of the material which may be disposed in the oven, the side movable members 3 may be actuated outwardly, through the agency of the mechanical means 4, as will be readily understood.

Those skilled in the art will experience no difficulty in understanding that, by reason of the adjustments just described, any desired distribution of heat within the oven may be effected and, moreover, that similar results may be accomplished by other means than those specifically set forth and such modifications as may be made without departing from the spirit and scope of my invention are intended to be covered by the appended claims.

I claim as my invention:

1. In a heating device, the combination with walls of heat-storage material having openings therein, movable members disposed in said openings, means for heating said material, and heat-insulating material enveloping said walls, of mechanical means for regulating the distribution of heat within said device.

2. In a heating device, the combination with walls of heat-storage material having openings therein, movable members disposed in said openings, means for heating said walls, and heat-insulating material surrounding said walls, of mechanical means for adjusting the position of said movable members.

3. In a heating device, the combination with walls of heat-storage material having openings therein, movable members disposed in said openings, electrical means for heating said material, and an envelop of heat-insulating material surrounding said parts, of mechanical means for effecting independent adjustments of said movable members.

4. In a heating device, the combination with a receptacle of heat-storage material, means for heating the same, and walls of heat-insulating material enveloping said receptacle, of mechanical means for regulating the distribution of heat within said receptacle.

5. In a heating device, the combination with a receptacle of heat-storage material, means for heating said material, and walls of heat-insulating material enveloping said receptacle, of means for adjusting the positions of portions of said receptacle.

6. In a heating device, the combination with a receptacle of heat-storage material, electrical means for heating the same, and walls of heat-insulating material surrounding said receptacle, of mechanical means for varying the amount of active heat-storage material composing the walls of said receptacle.

7. In a cooking device, the combination with an oven comprising walls of heat-storage material having openings therein, movable members adapted to fit into said openings, means for electrically heating said heat-storage material, and heat-insulating walls enveloping said oven, of adjustable mechanical means for varying the air gaps between said movable members and the main portions of said oven walls.

8. In a heating device, the combination with an oven comprising walls of heat-storage material having openings therein, pivotally mounted movable members adapted to fit into said openings, means for electrically heating said heat-storage material, and heat-insulating walls surrounding said oven, of means for effecting an outward rotative movement of said movable members about their pivotal supports, whereby changes in the distribution of heat within said oven are effected.

9. In an electrically heated oven, the combination with walls of heat-storage material, one of said walls having an opening therein, and heat-insulating material enveloping said walls, of a movable member adapted to fit into said opening and to make intimate contact with the adjacent edges of said wall, and mechanical means for moving said member with respect to said wall, whereby changes in the amount of heat conducted through said member are effected.

10. In an electrically heated oven, the combination with a receptacle comprising walls of heat-storage material, the side walls and top wall thereof being provided with movable portions, and heat-insulating material surrounding said walls, of independent mechanical means for actuating said top movable portion and said side movable portions, and independent means for locking said portions in position.

11. In a heating device, the combination with a receptacle of heat-storage material, means for heating the same, and walls of heat-insulating material enveloping said receptacle, of means for apportioning the amounts of heat severally delivered to various parts of the receptacle.

In testimony whereof, I have hereunto subscribed my name this 5th day of August, 1912.

THEODORE HOOCK.

Witnesses:
LOUIS VANDORY,
BESSIE F. DUNLAP.